United States Patent [19]

West et al.

[11] 4,349,856

[45] Sep. 14, 1982

[54] SAFETY START CONTROL FOR ELECTRICALLY POWERED APPARATUS

[75] Inventors: Frank L. West, Sharon; Larry A. Norton, Elkhorn, both, Wis.

[73] Assignee: Chromalloy American Corporation, New York, N.Y.

[21] Appl. No.: 140,202

[22] Filed: Apr. 14, 1980

[51] Int. Cl.³ ........................ H01H 33/00; F16P 3/04

[52] U.S. Cl. ................................ 361/160; 340/825.5; 307/114; 361/192

[58] Field of Search .................. 361/1, 160, 170, 192; 340/147 LP; 307/114

[56] References Cited

U.S. PATENT DOCUMENTS

| | | | |
|---|---|---|---|
| 2,344,441 | 3/1944 | Lorenz . | |
| 2,907,855 | 10/1959 | Hedges | 307/114 |
| 3,160,793 | 12/1964 | Colburn | 361/192 |
| 3,287,722 | 11/1966 | Craig | 307/114 |
| 3,351,817 | 11/1967 | Wadolny . | |
| 3,424,919 | 1/1969 | Howlett | 361/192 |
| 3,666,965 | 5/1972 | Luenser | 340/147 X |
| 3,686,510 | 8/1972 | Korb | 361/192 X |
| 4,017,832 | 4/1977 | Gilbert | 340/147 LP |

FOREIGN PATENT DOCUMENTS

| | | | |
|---|---|---|---|
| 2717839 | 4/1977 | Fed. Rep. of Germany | 307/114 |

*Primary Examiner*—J. D. Miller
*Assistant Examiner*—L. C. Schroeder
*Attorney, Agent, or Firm*—Wegner, McCord, Wood & Dalton

[57] ABSTRACT

Electrically powered apparatus is provided with a remote primary control station from which energization of the apparatus is usually controlled, and a secondary control station, such as a jog control station, which is remote from the primary control station and close to the apparatus, from which energization of the apparatus may also be controlled. A single manual push button start control module may be mounted at either station, so that when the module is at the secondary station there is no start button at the primary station. A holding circuit provides for extended energization of the apparatus when the push button is momentarily depressed at the primary station, and there is a stop button at the primary station; while the secondary station has no holding circuit. The holding circuit is disabled when the module is mounted at the secondary station, so the apparatus cannot be energized by mounting a second identical start control module at the primary station.

6 Claims, 9 Drawing Figures

SAFETY START CONTROL FOR ELECTRICALLY POWERED APPARATUS

BACKGROUND OF THE INVENTION

There are many types of electrically powered apparatus having a remote primary control station from which energization of the apparatus is usually controlled, and a secondary control station which is remote from the primary station, and usually close to the apparatus, from which energization of the apparatus may also be controlled. Typical of such secondary control stations are jog control stations which are placed close to the electrically powered apparatus so that a person servicing the apparatus may operate it from a conveniently located control station.

Typical of such apparatus are silo unloaders, and the present invention is described as applied to a silo unloader, although obviously it has broad applicability to many types of electrically powered apparatus.

A silo unloader is suspended from a tripod in the top of a silo, and may be lowered onto the top of the silage by a winch when it is necessary to remove some silage from the silo for animal feeding. The most popular types of silo unloaders have a sweep arm which extends from an area near the vertical axis of the silo to the silo wall and which is equipped with a cutting and conveying auger. The silo unloader is rotated slowly about the axis of the silo to move the sweep arm over the surface of the silage so as to cut silage from the top of the mass stored in the silo and convey it to the central area where it is picked up by an impeller that flings it through a chute connected to an open doorway in the silo wall.

The silo unloader is powered by a large electric motor, and energization of the motor is controlled from a primary control station which is commonly mounted on the outside of the silo wall near the ground, although it may be in an adjacent barn or shed. A typical silo unloader control station has a spring loaded normally open start switch and a spring loaded stop switch. A holding circuit permits extended operation of the silo unloader to be initiated by momentarily depressing the start switch to close the motor energizing circuit, and energization may be terminated by pushing the stop switch. In addition, it is usual for a silo unloader control station to have a timer actuated switch in the holding circuit so that an operator may set the timer to run the silo unloader for any desired period of time.

When it is necessary to service a silo unloader, the operator climbs a ladder on the outside of the silo, enters the silo through the open silage discharge door and stands on the silage while he works on the unloader. In common with most electrically powered apparatus which has a remote primary control station, there is a jog control station mounted on the silo unloader close to the motor, so the operator who is servicing the unloader may energize the motor to test unloader operation. Such a jog control station commonly has a spring loaded push button start switch with no holding circuit, so the motor is energized only as long as the operator manually depresses the start button.

Usually there is no way to disable a remote primary control station so as to eliminate the possibility that somebody will start the apparatus in ignorance of the fact that there is a person in the silo working on it. This makes it necessary for the operator to hang a warning sign on the primary control station before he enters the silo to service the unloader, but this is an easy thing to forget and requires that a warning sign be kept conveniently close to the primary control station.

Insofar as applicants are aware, there has heretofore been no simple and reliable means for disabling a remote primary control station when an operator is about to work on apparatus which may be started from the primary control station. The problem is particularly acute in the case of silo unloaders and other like equipment where the apparatus is not visible from the primary control station.

SUMMARY OF THE INVENTION

In accordance with the present invention, a system for controlling energization of electrically powered apparatus includes a primary control station from which energization of the apparatus is usually controlled, a secondary control station remote from the primary station from which energization of the apparatus may be optionally controlled, and a manually portable apparatus start control module which is usually operatively connected to the primary control station, but which may be manually removed from the primary control station and manually operatively connected to the secondary control station, so the start control module may be used to start energization of the apparatus either from the primary control station or from the secondary control station.

Most commonly the manually portable start control module will be used in connection with apparatus such as a silo unloader, in which the primary control station is remote from the electrically powered apparatus and the secondary control station is immediately adjacent the apparatus for convenience in servicing.

In a preferred form of the invention, the primary control station includes a holding circuit, so that momentary closing of the manual start switch may initiate continuing energization of the apparatus, and there is a manual stop switch in the holding circuit at the primary control station to stop energization of the apparatus. The secondary control station has no holding circuit, so that it serves as a jog station.

In a most preferred form of the invention, the holding circuit at the primary control station includes a normally closed relay, and a relay actuating circuit is closed by operatively connecting the start module to the secondary control station to open the normally closed relay and disable the holding circuit, so that energization of the apparatus cannot be started by using a duplicate start module operatively connected to the primary control station.

In most cases, the electrically powered apparatus will be a mechanical device which is powered by an electric motor, so the system controls energization of the motor. However, it is perfectly apparent that there are certain types of electrically powered equipment which do not utilize a motor, but which nevertheless require a primary control station and a secondary control station remote from the primary control station from which energization of the apparatus may be optionally controlled, and in which there is a hazard if the apparatus is energized from a secondary control station without disabling the primary control station.

A novel feature of the invention is the start control module in the form of a plug member having start contacts which match with fixed contacts on primary and secondary control stations, with the plug member adapted to be manually detachably mounted on either control station with the start contacts bearing upon the fixed contacts at the control station, and with a normally open push button start switch on the plug member which may be manually depressed to close an electric circuit through the start contacts at either station.

Other novel features of the start control module plug member will be apparent from the following detailed description and those claims which are directed expressly to various features of the module.

THE DRAWINGS

DETAILED DESCRIPTION OF THE INVENTION

Figure 1A:
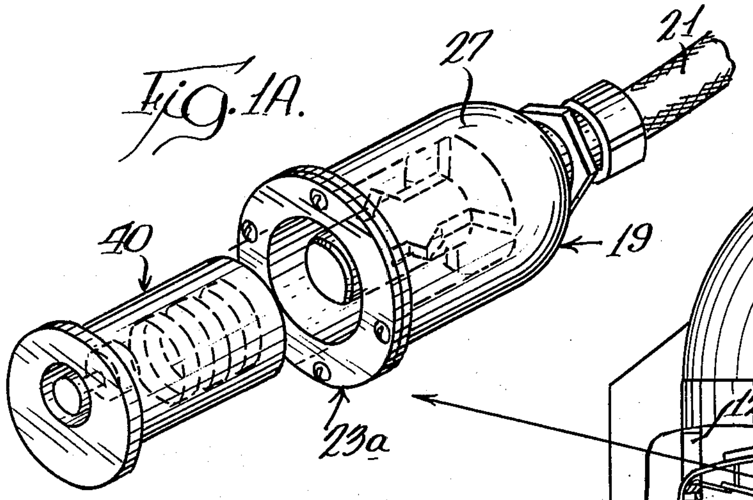
FIG. 1A is a perspective view of the secondary control station with the start control module in a position to be operatively connected therewith.
Figure 1:
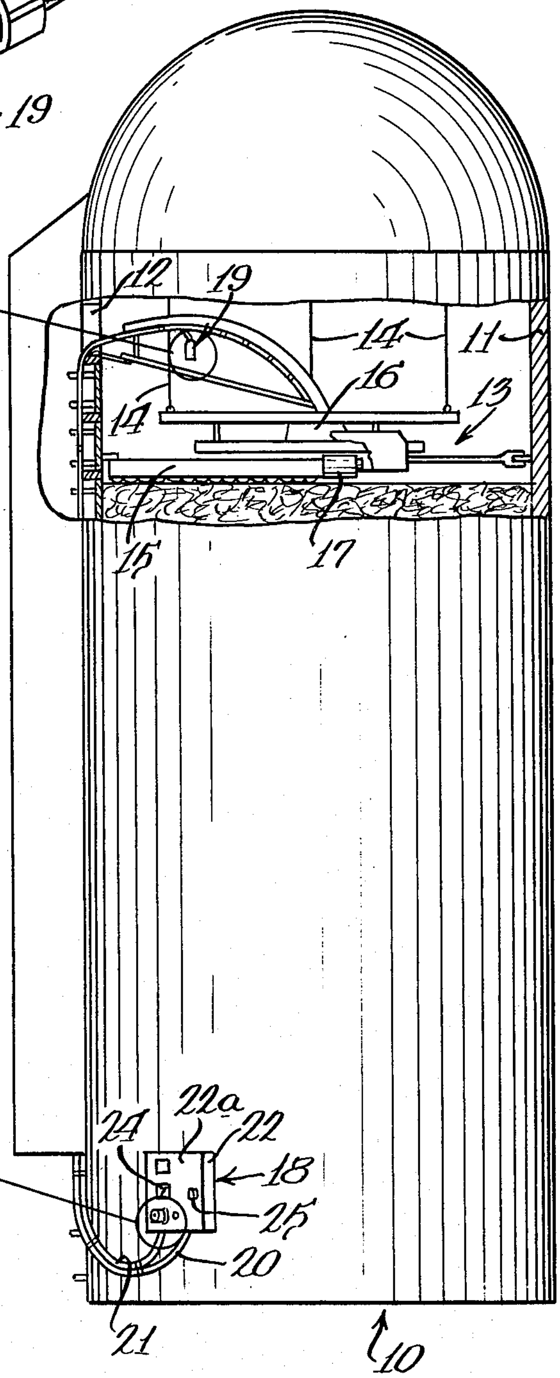
FIG. 1 is a side elevational view, partly in section, of a silo equipped with a silo unloader, and with a primary control station on the outside of the silo wall near the bottom and a secondary control station on the silo unloader.
Figure 1B:
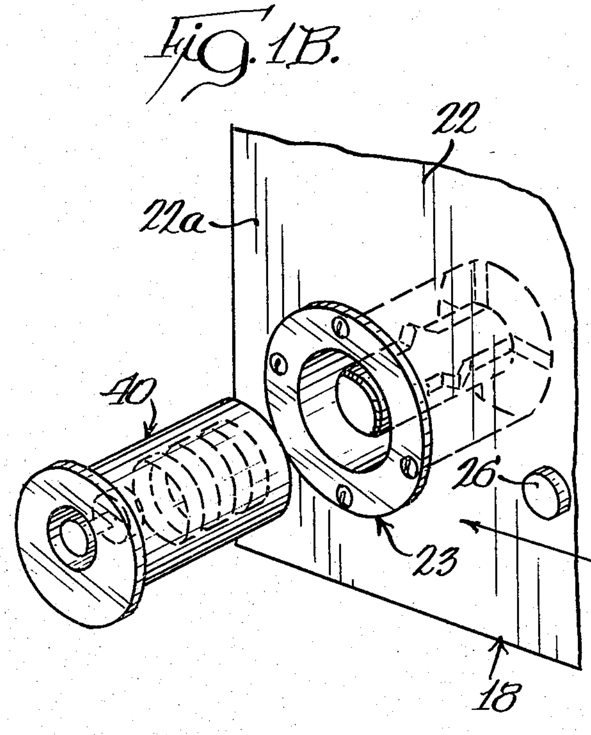
FIG. 1B is a fragmentary perspective view of the primary control station with the start control module in a position to be operatively connected thereto.

Referring to the drawings in detail, and referring first to FIGS. 1, 1A and 1B, the present invention is disclosed as applied to a silo unloader. As seen in FIG. 1, a silo 10 has a side wall 11 provided with the usual vertical row of silage discharge openings 12; and a silo unloader, indicated generally at 13, is suspended by cables 14 from a tripod (not shown) which surmounts the wall 11. The silo unloader 13 may be raised and lowered within the silo by means of a winch (not shown) near the bottom of the silo wall to which the cables 14 are operatively connected. The silo unloader includes a sweep arm 15 and an impeller 16, both of which are driven by an electric motor 17 through chains, belts or gear boxes in the usual manner.

Mounted on the outside of the silo wall 12 close to the ground is a primary control station, indicated generally at 18; and mounted upon the silo unloader is a secondary control station, indicated generally at 19, which is a jog station. A silo unloader cable 20 and a jog station control cable 21 extend from the primary control station 18 upwardly along the silo wall and are connected, respectively, to the motor 17 and to the jog station 19.

For purposes of the present disclosure and claims, the silo unloader 13 constitutes an electrically powered apparatus, and the power for the apparatus is provided by the electric motor 17.

As described up to this point, the apparatus is conventional. The present invention resides in the novel arrangement for starting energization of the motor 17 from the primary control station 18 or from the secondary, or jog control station 19; the invention resides further in the circuit for preventing energization from being started at the primary control station 18 when the secondary control station 19 is being used to control energization of the motor 17; and it resides further in the preferred start control module.

Figure 7:
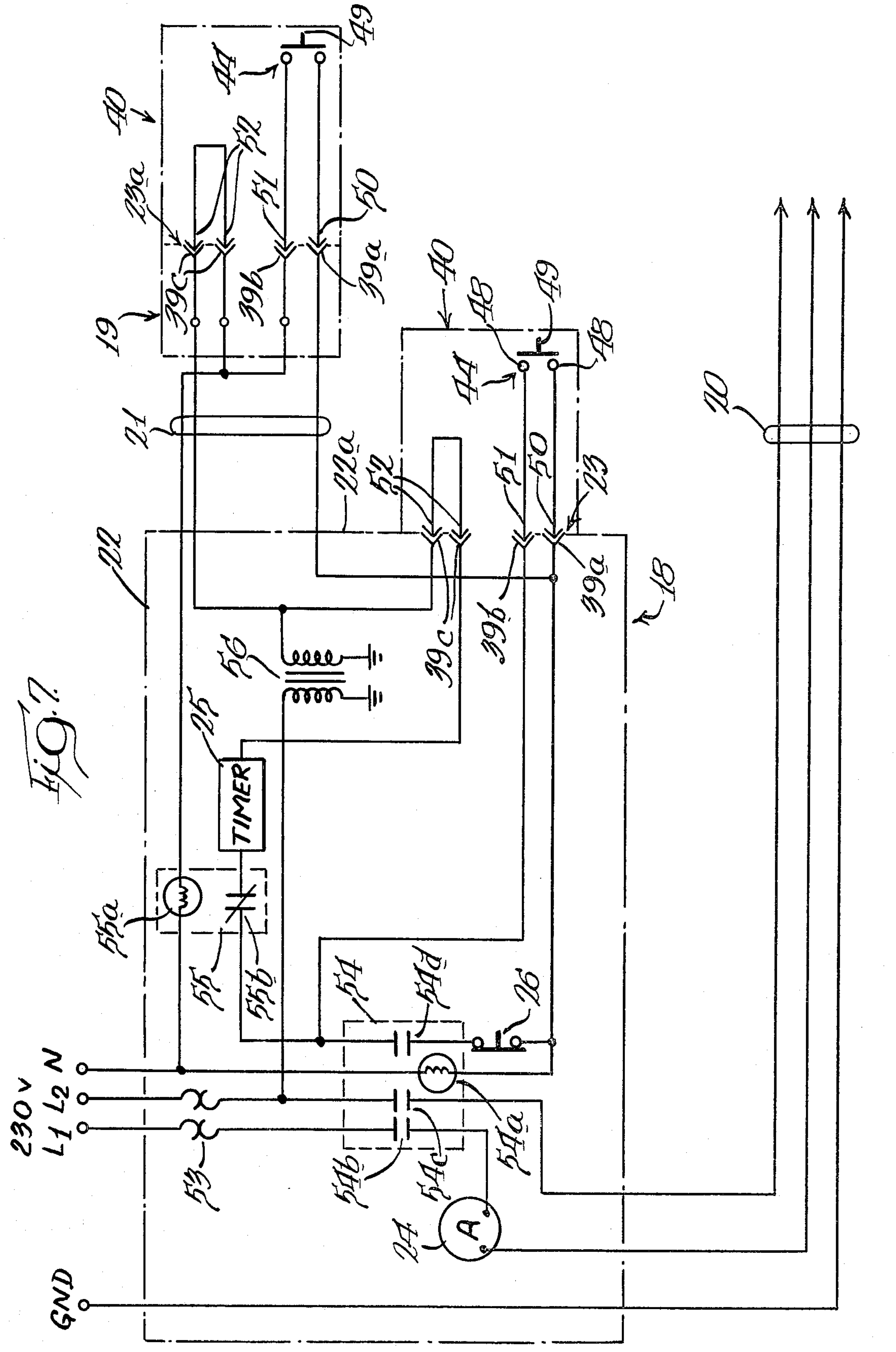
FIG. 7 is an electrical schematic of the control system.

Referring now to FIGS. 1A and 7, the primary control station 18 comprises a control box 22 having a front panel 22*a*; and mounted in an opening in the front panel is a start control module socket, indicated generally at 23. Also mounted on the front panel 22*a* are an ammeter 24, a timer 25, and a push button controlled stop switch 26, all shown diagrammatically in FIG. 7.

Figure 6:
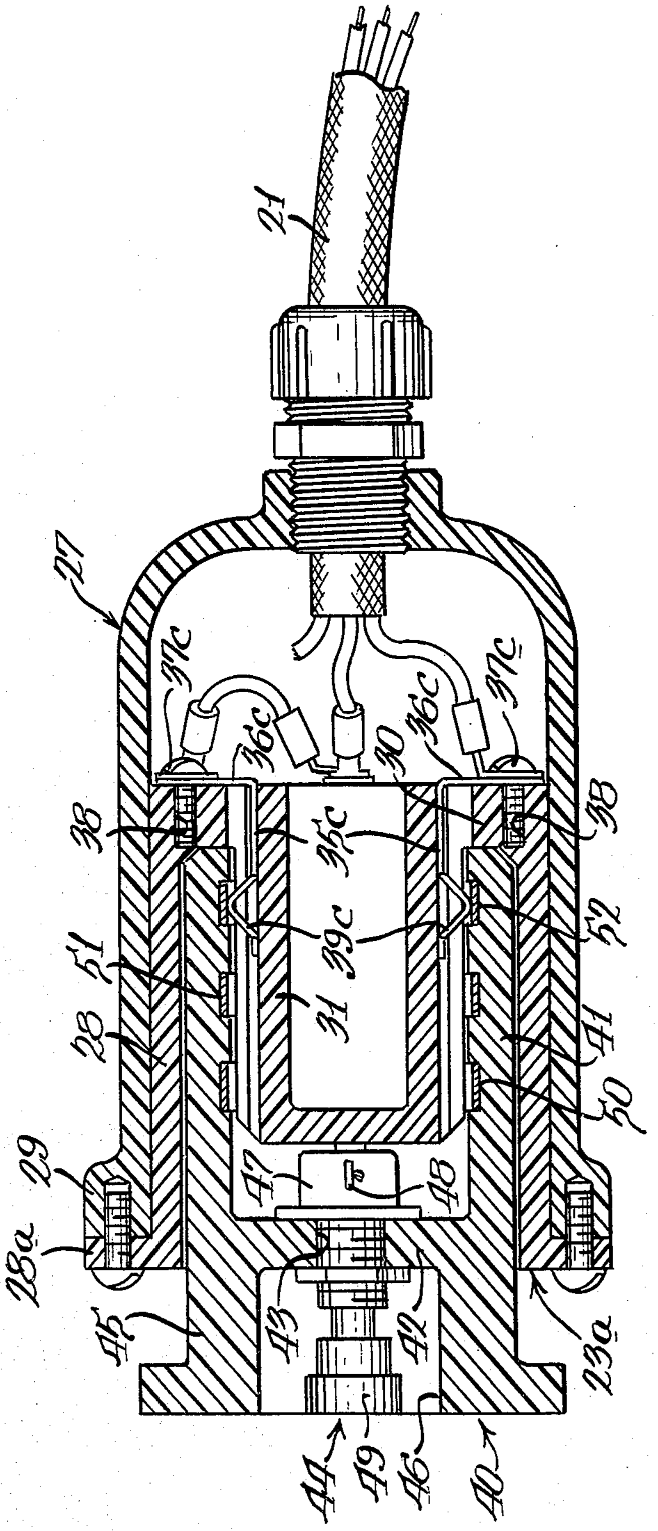
FIG. 6 is a longitudinal sectional view on an enlarged scale taken substantially as indicated along the line 6—6 of FIG. 1B with the start module inserted in the socket.

The secondary control station 19 is best seen in FIG. 6 to consist of a mounting shell 27 into which the jog station control cable 21 extends, and mounted in the shell 27 is a start control module socket 23*a* exactly like that at the primary control station 18.

Figure 3:
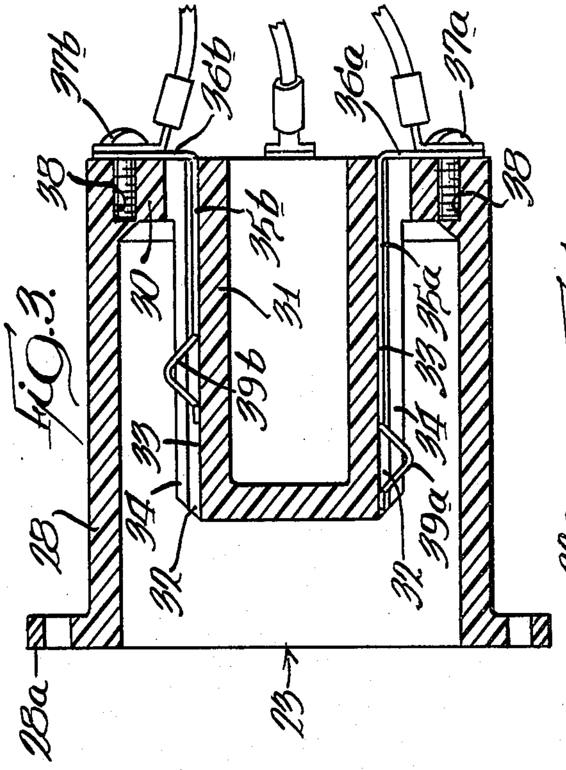
FIG. 3 is a longitudinal sectional view taken substantially as indicated along the line 3—3 of FIG. 2.

As best seen in FIGS. 3 and 6, each socket 23 or 23*a* consists of an annular wall 28 having a peripheral mounting flange 28*a* by means of which it may be secured either to the front plate 22*a* of the control box 22 or to a peripheral mounting boss 29 on the front of the shell 27. At the rear of the wall 28 is a transverse rear wall 30 at the center of which is a hollow boss 31 which is concentric with the wall 28 and cooperates with it to define an annular pocket in which the forward end portion of a start control module, indicated generally at 40, is seated.

The hollow boss 31 has four longitudinal slots 32 at 90° intervals about its circumference, and each slot includes a contact seat 33 with overhanging lips 34, so that fixed metal electrical contact members 35*a* and 35*b*, and additional electrical contact members 35*c* may be slid longitudinally into the seats 33 from the rear and retained by the lips 34. The contact members 35*a*, 35*b* and 35*c* have respective radially outwardly extending bracket portions 36*a*, 36*b* and 36*c*, through which respective screws 37*a*, 37*b* and 37*c* pass and are received in threaded holes 38 in the socket bottom wall 29. The contact members 35*a*, 35*b* and 35*c* have respective radially offset portions 39*a*, 39*b* and 39*c* adjacent their free ends, and said offset portions provide resilient electrical contacts extending into the pocket between the wall 28 and the boss 31. A comparison of FIGS. 3 and 6 will show that the offset spring contacts 39*a* and 39*b* are axially spaced from one another, while the spring contacts 39*c* are in the same transverse plane with one another.

Figure 5:
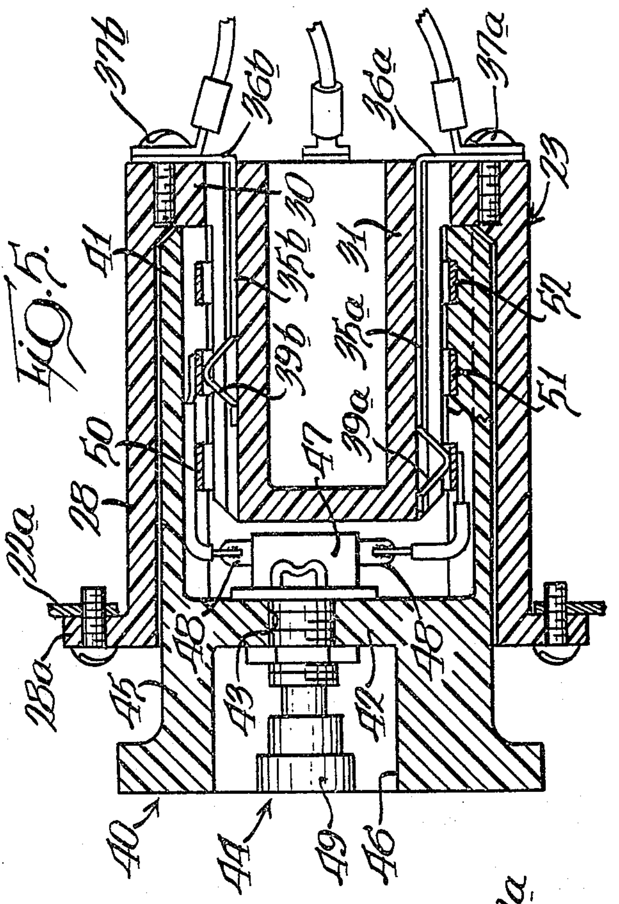
FIG. 5 is a longitudinal sectional view taken substantially as indicated along the line 5—5 of FIG. 4.
Figure 2:
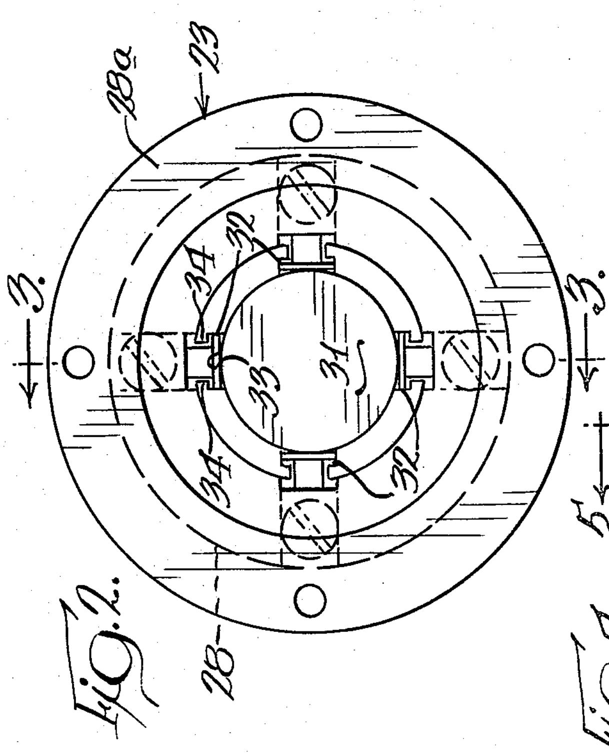
FIG. 2 is a front elevational view of the socket seen in FIG. 1A and FIG. 1B.
Figure 4:
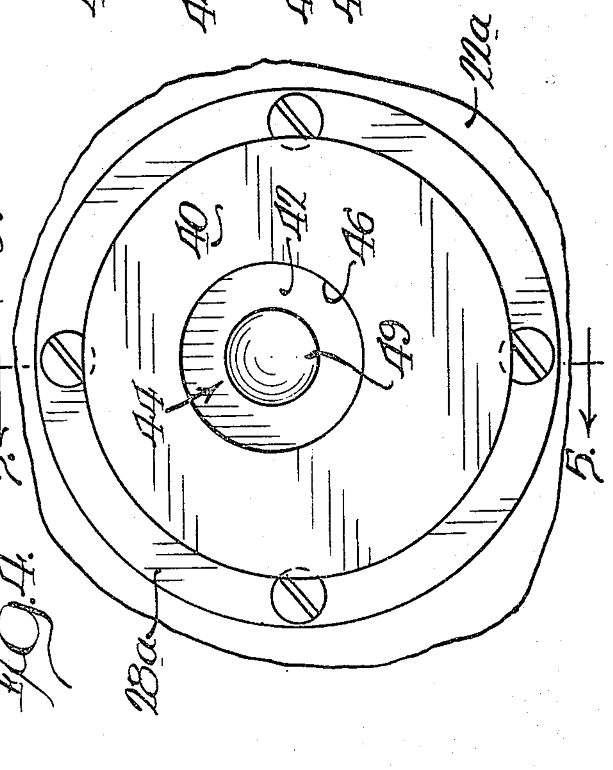
FIG. 4 is a front elevational view of the socket of FIG. 1A with the start module seated therein.

Referring now particularly to FIGS. 5 and 6, the start control module 40 of the present invention consists of a plug having an annular web 41 which seats in the pocket defined by the socket side wall 28 and the boss 31. Integral with the outer end of the web 41 is an end wall 42 which has an opening 43 to receive a push button start switch subassembly, indicated generally at 44. An annular wall 45 is integral with and extends axially from the end wall 42 to define a recess 46 in which the push button subassembly 44 is entirely recessed. The push button assembly 44 is a commercially available, normally open momentary switch which includes a contact box 47 having terminals 48, and a push button 49 which is spring biased to the position illustrated in FIGS. 5 and 6.

The shell 41 has axially spaced internal annular start contacts 50 and 51 which bear upon the respective spring contacts 39*a* and 39*b* when the plug 40 is fully seated in the socket 24. In addition, the plug has a relay actuating contact ring 52 which is seen in FIG. 6 to bear upon the additional contacts 39*c* of the socket.

Referring now to FIG. 7, the electrical system for the operation and control of the silo unloader 13 includes 230 volt lines L1 and L2 and a neutral line N, with the lines L1 and L2 wired through a circuit breaker 53 in the box 22 at the primary control station 18. A normally open relay 54 having an actuating solenoid 54*a* is part of a holding circuit at the primary control station 18; and in the holding circuit there is also a normally closed relay 55 which has an actuating solenoid 55*a*. The timer 25, previously referred to, is also seen to be in the holding circuit in series with the normally closed relay 55; and the normally closed push button stop switch 26 is also in that circuit. A reducing transformer 56 provides 24 volt current for the control circuit.

When the plug 40 is inserted in the socket 23*a* at the primary control station 18 it establishes a continuous circuit from the line L2 through the transformer 56, the contacts 39*c* and the annular plug contact 52, through the timer 25 and the normally closed relay 55 back to the fixed contact 39*b*, the ring contact 51, the ring contact 50, the fixed contact 39*a*, the solenoid 54*a* of the relay 54, and the line N. When the timer is set and the manual push button 49 of the push button switch module 44 is depressed to momentarily close the circuit across the contacts 48 of the switch subassembly 44, the solenoid 54*a* is energized to close the motor drive circuit 20 through the normally open relay contacts 54*b* and 54*c*, and at the same time the contacts 54*d* in the relay 54 are also closed.

The motor 17 usually remains energized until the timing out of the timer 25 opens the circuit across the relay contacts 54*d*, deactivates the relay solenoid 54*a*, and opens the holding circuit. The stop switch 26 may be momentarily opened to reach the same result if it is necessary to deenergize the motor before the timer times out.

When the plug 40 is inserted in the socket 23*a* at the secondary control station 19, the annular contact 52 of the plug connects the additional fixed contacts 39*c* in the socket 23*a* so as to complete a circuit which energizes the relay solenoid 55*a* to open the switch 55*b* in the relay 55. Thereupon, even if a second start control module plug 40 is seated in the socket 23 and the push button 49 of that second plug 40 is pressed the motor drive circuit 20 will not be energized. However, pressing the push button 49 at the secondary control station 19 will energize the solenoid 54*a* to close the relay contacts 54*b* and 54*c* and thus close the motor drive circuit for as long as the start button at the secondary control station is manually depressed.

The foregoing detailed description has been given for clearness of understanding only and no unnecessary limitations should be understood therefrom as modifications will be obvious to those skilled in the art.

We claim:

1. In a system for controlling energization of electrically powered apparatus, in combination:

a primary control station remote from said apparatus from which energization of the apparatus is usually controlled;

a secondary control station which is immediately adjacent said apparatus so as to be conveniently accessible to a person servicing the apparatus, and from which energization of said apparatus may be optionally controlled, said secondary control station having no start switch and being adapted to receive a manual start switch;

and a single manually portable apparatus start control module which is usually operatively connected to said primary control station, said start control module having a manually operable start switch and being manually removable from said primary control station to leave the primary control station without a start switch, and being manually operatively connectable to said secondary control station to provide the secondary control station with a start switch, whereby said start control module may be used to start energization of the apparatus either from said primary station or from said secondary station, and there is no start switch at the primary station when said module is operatively connected to the secondary station.

2. The combination of claim 1 in which the start control module includes a normally open manual start switch to close an energizing circuit, the primary control station includes a holding circuit which permits momentary closing of the manual start switch to initiate continuing energization of the apparatus, there is a manual stop switch at said primary control station for disabling said holding circuit, and the secondary control station has no holding circuit, so when started from said secondary control station the apparatus is energized only while the start switch is held closed.

3. The combination of claim 2 which includes a normally closed relay in the holding circuit at the primary control station, and the secondary control station includes a relay actuating circuit which is closed by operatively connecting the start module to said secondary control station to open said normally closed relay and disable the holding circuit, whereby energization of the apparatus cannot be started by using a duplicate start module operatively connected to the primary control station.

4. The combination of claim 1 in which the primary and secondary control stations are provided with identical elements having a plurality of fixed electrical contacts, the start control module is a plug which is adapted to be manually detachably mounted on either of said elements, and a plurality of electrical start contacts on the plug bear upon said fixed contacts when said module is mounted on either of said elements.

5. The combination of claim 1 or 2 or 3 or 4 in which the apparatus includes a mechanism having exposed moving parts that are hazardous to a person servicing the apparatus and an electric motor to drive the mechanism, the system controls energization of the motor, and the secondary control station is supported upon the apparatus.

6. The combination of claim 5 in which the apparatus is a silo unloader for cutting silage from the top of a mass of silage stored in a silo and discharging said silage from the silo, the primary control station is near the base of the silo, and the secondary control station is on the silo unloader.

* * * * *